United States Patent Office 2,838,511
Patented June 10, 1958

2,838,511

PREPARATION OF TRIARYL ISOCYANATES

Irving Charles Kogon, Wilmington, Del., assignor to E. I. du Pont de Nemours and Company, Wilmington, Del., a corporation of Delaware No Drawing. Application October 31, 1955
Serial No. 544,064

5 Claims. (Cl. 260—248)

This invention relates to the preparation of organic compounds, and more particularly to the preparation of triaryl isocyanurates.

While in general triphenyl isocyanurates have been prepared by heating phenyl isocyanate in the presence of a triaryl phosphine or an alkaline salt such as potassium acetate, this method is not operable with or applicable to all aryl isocyanates for it is found that one of the present commercial isocyanates, such as orthotolyl isocyanate, will not be converted to the triphenyl isocyanurate particularly when using potassium acetate. Furthermore, the prior art processes are only applicable in the preparation of symmetrical triaryl isocyanurates.

It is an object of the present invention to provide a simple and economical method for preparing triaryl isocyanurates, and one which can be used in the preparation of the unsymmetrical triaryl isocyanurates. It is a further object of the invention to provide a process for preparing triaryl isocyanurates in substantially theoretical yields.

The process of the present invention involves the preparation of triaryl isocyanurates by heating an aryl isocyanate or a dimer of the same with an aryl urethane or with a diaryl allophanate in the presence of catalytic amounts of a tertiary amine.

The chemical reactions involved in this process may be represented by the following equations, in which R and R' stand for an aryl radical of the benzene or naphthalene series, which radical may also contain substituents which do not react with isocyanates, such as halogen, nitro, methoxy, lower alkyl groups such as those of from 1 to 6 carbon atoms, and an additional phenyl group. The "A" stands for an alkyl radical of from 1 to 6 carbon atoms.

(1) An aryl isocyanate+an aryl urethane

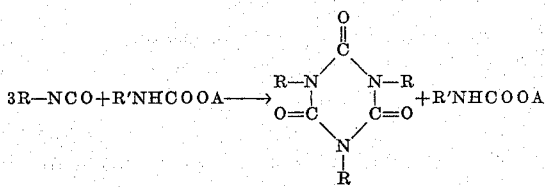

(2) Dimer of an aryl isocyanate+an aryl urethane (3) An aryl isocyanate+a diaryl allophanate (4) Dimer of an aryl isocyanate+a diaryl allophanate It is not immediately apparent how the urethane enters into the reactions above formulated, for it will be noted that the aryl group in the urethane is not introduced into the resulting triaryl isocyanurate and therefore the particular urethane employed need not be one that carries the particular aryl group which is to be part of the resulting triaryl isocyanurate. In this reaction it will be noted that three mols of the aryl isocyanate are trimerized due to the presence of the aryl urethane and the tertiary amine catalyst. In the same manner as illustrated in the above formula, 3 mols of the aryl isocyanate dimer are caused to react to form the triaryl cyanurate, but, again, the aryl group of the aryl urethane is not introduced into the triaryl isocyanurate. In the reactions illustrated by equations 3 and 4, the one aryl group of the allophanate enters into the formation of the triaryl isocyanurate, for it will be noted that the allophanate contains an aryl isocyanate which is split off, leaving the aryl urethane. In other words, in the latter reactions the urethane is generated and recovered while the RNHCO radical gives up one hydrogen to the urethane and enters into the isocyanurate molecule.

Non-polar solvents, such as benzene, toluene, orthodichlorobenzene, etc., may be used. In such solvents the reactants are soluble and the isocyanurates are insoluble.

The process is generally conducted by mixing the two reactants in a vessel, optionally provided with agitation, and a source of heat, adding a catalytic proportion of a tertiary amine and heating the mass. When the reaction is complete, an inert solvent is added to dissolve the by-product urethane and the insoluble isocyanurate is filtered off. After washing the insoluble cyanurate with the solvent, it is dried. No further purification is required. Where the reaction is carried out in a solvent, the insoluble isocyanurate is filtered off, washed wtih the same or any other desirable solvent, and dried, and, again, no further purification is required.

Illustrative of the aryl isocyanates which may be trimerized in the presence of an aryl urethane and a tertiary amine catalyst, are the following:

Phenylisocyanate
o-Tolylisocyanate
p-Tolylisocyanate
p-Nitrophenylisocyanate
p-Methoxyphenylisocyanate
o-Chlorophenylisocyanate
p-Tertiarybutylphenylisocyanate
p-Phenylphenylisocyanate
Alpha-naphthylisocyanate
p-Phenylmethylene phenyl isocyanate.

The dimers of these isocyanates may also be used.

The urethanes (or frequently called carbamates) used may have various aryl groups attached to the nitrogen and the alkyl group in the urethane is any simple alkyl group such as methyl, ethyl, butyl and hexyl. The urethanes are readily made by known methods by simply reacting the desired aryl isocyanate with the desired alcohol (Whitmore, "Organic Chemistry," Second Edition, 1951, D. Van Nostrand Company, Inc., page 429).

The allophanates are prepared by reacting an aryl isocyanate with the urethane, or by reacting phenyl isocyanate dimer with alcohol. They are substitution products of allophanic acid, $NH_2CONHCOOH$ (ibid, p. 433). The reaction may be written:

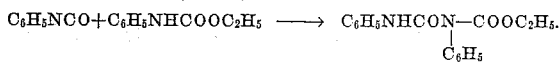

N,N'-diphenylethyl allophanate is prepared by simply heating from 3 to 10 mols of phenyl isocyanate with 1 mol of phenylethyl urethane at from 120 to 140 degrees C. for about 24 hours and then distilling off the excess isocyanate under vacuum. Any of the isocyanates mentioned above may be used in the preparation of the urethane and the allophanates.

The tertiary amines used as catalysts are preferably sufficiently high boiling that they will not be excessively vaporized at the temperature of reaction. In general, tertiary amines boiling above 100 degrees C. are preferred. Typical tertiary amines are N-methylmorpholine, pyridine, dimethylaniline, diethylaniline, N-methylpiperidine, diethylcyclohexylamine, etc. About 1% to 5% of tertiary amine is used as the catalyst, based on the weight of the reactants.

The reaction may be carried out at temperatures of from about 70 to 80 degrees C. up to about 200 degrees C. Ordinarily the reaction will take place between about 80 degrees C. and 150 degrees C., and it is usually necessary to supply heat during the reaction. Some of the more reactive materials may set up an exothermic reaction and cooling may be necessary to control the reaction, particularly if larger quantities of reactants are involved.

Any inert solvent for the by-product urethane may be used in purifying the isocyanates. The solvent, of course, should not be a solvent for the isocyanurates. Solvents such as ether, acetone, ethyl acetate, methyl-ethyl ketone, etc., are suitable for the purification.

In Equations 3 and 4 above, where unsymmetrical isocyanurates are to be produced, the allophanate method will be employed in which the desired isocyanate radical has been introduced in the allophanate, which radical is different from the isocyanates that are otherwise entering into the trimerization reaction.

The triaryl isocyanurates produced by the process of this invention are quite stable thermally and can be heated well beyond their melting points without decomposition. Those containing reactive substituents on the aryl rings are of particular value in the preparation of trifunctional compounds which can be used in producing condensation polymers in which cross-linking is desired, such as in the manufacture of the polyurethane type of elastomers. The nitrogroup contained in the aryl rings can be readily reduced to the amines, and these triamines having good thermal stability are very suitable for further condensation in the preparation of polyurethane type isocyanate resins, including elastomers, since they give a cross-linking as well as a chain-extending effect which is very desirable, particularly in the preparation of elastomers. These triamines are also suitable as curing agents for the ethoxyline resins (epoxy resins). The triamino compounds can be converted by phosgenation to the triisocyanates which, as disclosed in current literature, are useful in the preparation of high molecular weight polymers.

The alkyl substituted triaryl isocyanurates can be readily oxidized to the tricarboxylic acids which are useful in condensation polymerization to form polyester resins, particularly where cross-linking is desired. The unsubstituted triaryl isocyanurates can be readily halogenated and the resulting halogen compounds serve as intermediates in the preparation of amines or other substitution derivatives.

The following examples are given to more fully illustrate the process of the present invention. The parts used are by weight, unless otherwise specified.

*Example 1*

A mixture of 33 parts of phenylisocyanate (0.278 mol), 8.3 parts of phenylethylurethane (0.05 mol) and 1.5 parts of N-methylmorpholine is heated at 140 degrees C. At the end of 17 hours an exothermic reaction raised the temperature to 192 degrees C. On cooling it becomes solid at 180 degrees C. The mass is cooled to room temperature. 70 parts of dry ether are added and the solid is macerated thoroughly. The insoluble triphenyl-isocyanurate is filtered off, washed thoroughly with ether and then dried in the air. 32.3 parts are obtained. The product has a melting point of 280 degrees C. A mixed melting point with an authentic sample of triphenyliso-cyanurate melting at 280 degrees C. shows no depression of the melting point. From the filtrate, 7.8 parts of phenylethylurethane melting at 48 degrees C. is obtained. A mixed melting point with authentic phenylethylurethane shows no depression of the melting point. The yield of triphenylisocyanurate is 98% of theory. (Theory assumes that all of the phenyl isocyanate is converted to the isocyanurate and the phenylethylurethane is recovered as such.)

*Example 2*

A mixture of 11.9 parts (0.05 mol) of the dimer of phenylisocyanate,

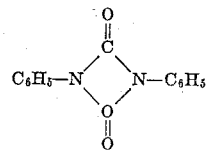

8.3 parts (0.05 mol) of phenylethylurethane and 1 part of N-methylmorpholine is heated at 125 to 130 degrees C. for 48 hours. A mass of large crystals forms. The mass is cooled to room temperature, 35 parts of ether are added and the vessel cooled in water of from 0 to 5 degrees C. while the crystals are broken up. The tan crystals remaining undissolved are filtered off and then washed with ether. A further precipitate in the cold ether is filtered off and added to the first and the crystals are air dried. The yield is 11.8 parts of 99% of theory of triphenylisocyanurate melting at 278 degrees C.

*Example 3*

A mixture of 23.8 parts of phenylisocyanate, 14.2 parts of N,N'-diphenylethyl allophanate,

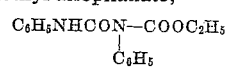

and 1 part of N-methylmorpholine is heated at from 95 to 100 degrees C. for 48 hours. The crystalline mass which forms is cooled, taken up in ether, filtered, washed and air dried. 18 parts of triphenylisocyanurate melting at 279 degrees C. are obtained.

*Example 4*

71 parts of N,N'-diphenylethylallophanate, 59 parts of the dimer of phenylisocyanate and 3 parts of pyridine are heated together at from 95 to 100 degrees C. for about 2 hours. The crystalline solid which is obtained is broken up in 1400 parts of ether and filtered, washed and air dried. There is obtained 79.8 parts of triphenylisocyanurate melting at 280 degrees C., which is a 90% yield.

*Examples 5 to 9, inclusive*

The following triarylisocyanurates are made according to the methods of Example 1:

| Ex. No. | Reactant | Melting Point of Triisocyanurate, degrees C. |
|---|---|---|
| 5 | p-tolylisocyanate+p-tolyl methyl urethane | 264 |
| 6 | p-nitrophenylisocyanate+p-nitrophenylethyl urethane | >350 |
| 7 | p-methoxyphenyl isocyanate+p-methoxyphenylethyl urethane | 260 |
| 8 | o-chlorophenyl isocyanate+m-chlorophenylethyl urethane | 201 |
| 9 | o-tolylisocyanate+o-tolylethyl urethane | 180 |

Infrared absorption spectra of substituted triphenylisocyanurates show absorption peaks of 5.87 to 5.90 m$\mu$ for the ortho substituents and three main peaks at 5.66-5.67, 5.83–5.87 and 5.94–5.95 m$\mu$ for the para substituents.

I claim:

1. A process for preparing triaryl isocyanurates which comprises heating a compound of the class consisting of phenyl isocyanate, substituted phenyl isocyanate, naphthyl isocyanate and dimers thereof with a compound of the class consisting of aryl urethanes and diaryl allophanates, the aryl radical in each case being a member of the group consisting of phenyl, substituted phenyl, and naphthyl, at a temperature of from 70° to 200° C., in the presence of from 1 to 5%, by weight, of a tertiary amine catalyst, said tertiary amine catalyst having a boiling point of at least 100° C., the mol ratio of said isocyanates and dimers thereof to said aryl urethane being at least 1:1, and, the mol ratio of said phenyl isocyanate, substituted phenyl isocyanates and naphthyl isocyanates to said diaryl allophanate being at least 2:1, the mol ratio of said isocyanate dimers to said diaryl allophanate being at least 1:1, said phenyl substituents being non-reactive with isocyanate groups.

2. A process for preparing a triphenyl isocyanurate which comprises heating phenyl isocyanate with phenylethyl urethane at a temperature of at least 80 to 150° C. in the presence of from 1 to 5%, by weight, of a tertiary amine catalyst, said amine having a boiling point of at least 100° C., the mol ratio of said isocyanate to said urethane being at least 1:1.

3. The process of claim 2 wherein the tertiary amine is N-methyl morpholine.

4. A process for preparing a triphenyl isocyanurate which comprises heating phenyl isocyanate with N,N'-diphenylethyl allophanate at a temperature of from 80 to 150° C. in the presence of from 1 to 5%, by weight, of a tertiary amine catalyst having a boiling point of at least 100° C., the mol ratio of said isocyanate to said allophanate being at least 2:1.

5. The process of claim 4 wherein the tertiary amine is pyridine.

References Cited in the file of this patent

UNITED STATES PATENTS

| 2,640,068 | Schaefer | May 26, 1953 |
| 2,671,082 | Stallman | Mar. 2, 1954 |
| 2,683,144 | Balon et al. | July 6, 1954 |
| 2,703,810 | Viard | Mar. 8, 1955 |